United States Patent [19]
Nara et al.

[11] 3,819,485
[45] June 25, 1974

[54] PROCESS FOR PRODUCING SPECTINOMYCIN

[75] Inventors: Takashi Nara; Seigo Takasawa; Ryo Okachi; Isao Kawamoto; Masaru Kumakawa; Mitsuyoshi Yamamoto; Seiji Sato, all of Tokyo, Japan

[73] Assignee: Abbott Laboratories, Chicago, Ill.

[22] Filed: July 3, 1972

[21] Appl. No.: 268,764

[52] U.S. Cl............................................... 195/80 R
[51] Int. Cl............................................. C12d 9/00
[58] Field of Search...................................... 195/80

[56] References Cited
UNITED STATES PATENTS
3,234,092    2/1966    Bergy et al.................... 195/80 R OTHER PUBLICATIONS
Antimierobial Agents and Chemotherapy; pages 495–530; 1961

*Primary Examiner*—A. Louis Monacell
*Assistant Examiner*—Robert J. Warden
*Attorney, Agent, or Firm*—Joseph M. Fitzpatrick; James L. Bailey

[57] ABSTRACT

The antibiotic spectinomycin is produced by culturing *Streptomyces hygroscopicus* var. *sagamiensis* in a nutrient medium and thereafter recovering the antibiotic from the culture liquor.

3 Claims, No Drawings

PROCESS FOR PRODUCING SPECTINOMYCIN

BACKGROUND OF THE INVENTION

The present invention relates to the antibiotic spectinomycin and more particularly to a process for producing spectinomycin by fermentation on an industrial scale.

Spectinomycin is an antibiotic which was discovered independently by Oliver et al. and Mason et al. in 1961, as reported in Antimicrobial Agent and Chemotherapy, 495, 503, 507, 516 and 520 (1961) and Antibiotics and Chemotherapy, 11, 118, 123, 127 and 661 (1961). It has, from these publications, been known that the antibiotic is produced by *Streptomyces flavopersicus* or *Streptomyces spectabilis*.

Spectinomycin, also known as actinospectacin, is a water-soluble basic antibiotic and is characterized by the following chemical structural formula:

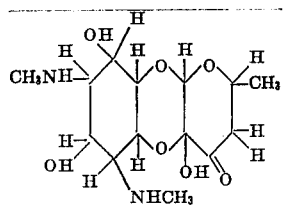

It is well known that the present antibiotic is active against a broad spectrum of Gram-positive and Gram-negative bacteria, and is effective upon various infections caused by these phlogogenous bacteria. It is also well known that the present antibiotic can be applied to feedstuffs as an additive for promoting growth of various animals because of its low toxicity and broad antibacterial spectra.

In addition, spectinomycin has an excellent effect as an agricultural chemical. For example, in field tests, 5 to 10 ppm of spectinomycin is found to be effective upon the pear blight induced by bacteria of the genus *Xanthomonas*. Since an effective amount of streptomycin upon the same disease is 100 ppm, spectinomycin is 10 to 20 times stronger in antibacterial activity as compared with streptomycin. Further, 5 to 10 ppm of spectinomycin is effective upon the canker of orange caused by *Xanthomonas citri* or bacterial leaf blight of rice plants caused by *Xanthomonas oryzae*.

DESCRIPTION OF THE INVENTION

In accordance with the present invention, the antibiotic spectinomycin is produced by a new type of actinomycetes quite different from the two species heretofore known as producing the antibiotic; and further that this new type of actinomycetes can readily accumulate a relatively large amount of spectinomycin in a nutrient medium without contamination by other by-product antibiotics. Accordingly, cultivation of the present microorganism provides a very advantageous process for producing spectinomycin on an industrial scale.

The microorganism used in the present invention is a strain of *Streptomyces hygroscopicus* var. *sagamiensis*, a new variant of the genus *Streptomyces*, which has been found and named by the present inventors. A typical strain is *Streptomyces hygroscopicus* var. *sagamiensis* (FERM-p 1010), which was isolated from soil at the shores of Lake Sagami in Kanagawa-ken, Japan. This particular strain has been deposited with the American Type Culture Collection, Rockville, Md., and has been accorded accession No. 21703.

The above-noted strain is characterized by the following properties:

I. Morphology

Generally growth is yellowish brown with grayish-white aerial mycelium. The aerial mycelium is white at first, then turns grayish and sometimes moistens and further turns black. The aerial mycelium is simply branched and in most cases has more than 10 spores at the extreme point forming spirals. The spore surface is warty.

II. Cultural characteristics on various media

Cultural characteristics on eight kinds of media after culturing at 30°C for 2 weeks are shown in Table 1.

In Table 1, the indications within the parentheses are in accordance with the color classification of Color Harmony Manual (Container Corporation of America); and S: Color of the surface of substrate mycelium
R: Color of the reverse side of substrate mycelium III. Physiological Properties:

Growth temperature range: 20° to 45°C
Liquefaction of gelatin: positive
Hydrolysis of starch: positive
Action upon defatted milk: no coagulation is observed but peptonization is observed Table 1

| Medium | Growth | Substrate mycelium | Formation of aerial mycelium | Aerial mycelium | Soluble pigments |
|---|---|---|---|---|---|
| Sucrose-nitrate agar | poor | colorless | good | white (a) gray (5ih) | none |
| Glucose-asparagine agar | poor | colorless | moderate | white (a) gray (5fe) | none |
| Glucose-nutrient agar | moderate | yellowish brown S: (2ie) R: (2ie) | good | white (a) | none |
| Oatmeal agar | poor | colorless | moderate | gray (10fe) (3nl) | none |
| Starch agar | moderate | yellowish greenish brown S: (2gc) R: (2gc) | good | white (a) gray (5ih) | none |
| Tyrosine agar | poor | colorless | poor | gray (b) | none |
| Yeast-malt agar | moderate | yellowish brown S: (2gc) R: (2gc) | good | gray (5ih) (3ba) | none |
| Glycerol-asparagine agar | moderate | yellowish brown S: (2ec) R: (2ec) | good | white (a) gray (5fe) | none |

Formation of melanine-like pigment: no pigment is produced on tyrosine agar medium and tryptone-yeast extract agar medium but slightly brown pigment appears on peptone-yeast extract-iron agar medium. From the observation, it is regarded as non-chromogenic.

IV. Assimilability of carbon source

The assimilability of carbon sources by the present strain is shown in Table 2.

Table 2

| Carbon Source | Assimilability | Carbon Source | Assimilability |
|---|---|---|---|
| D-arabinose | − | Raffinose | − |
| D-xylose | ± | Mannitol | ++ |
| Glucose | ++ | Glycerol | ++ |
| D-fructose | ++ | Salicin | + |
| Sucrose | ± | Lactose | ± |
| Inositol | − | Mannose | ++ |
| L-rhamnose | − | | |

As is evident from the foregoing, the present strain possesses the characteristics of *Streptomyces hygroscopicus*. That is, the present strain is an actinomycetes forming spiral sporophores and is non-chromogenic. Also, the surface of the spores is warty and the color of the aerial mycelium changes from white to blackish gray with moistening. As is well known, *Streptomyces hygroscopicus* includes a wide range of strains and many antibiotic-producing strains have been reported as belonging to *Streptomyces hygroscopicus*. For example, such strains are known to produce carbomycin, hygromycin, hygromycin-B, hygroscopin-A, -B and -C, hygrostatin, relomycin, tylosin, A-10598, $K_{13}$, $K_{27}$, $K_{28}$, NP-522, glebomycin, angustmycin-A, and -C, azalomycin-B and -F, copiamycin, psicofuranine, decoyinine, antiprotozoin, ossamycin, AM-684, dianemycin, streptothricin, leucocidin, polyetherin-A, duamycin, 16511-RP, etc. [Index of Antibiotics from Actinomycetes, H. Umezawa, P. 936, 1967, University of Tokyo Press, Tokyo and University Park Press, State College, Pa. and Identification Keys for Antibiotics producing Streptomycetes, No. 2, Antibacterial Antibiotics producers, T. Arai, Y. Mikami, J. Koike, p. 83, p. 84, Study Group of Actinomycetes.] However, the strain of the present invention produces an antibiotic different from any of these antibiotics, that is, spectinomycin. In such manner, the present strain is distinguished from the well known strains. Further, as shown in Table 3, the present strain has properties clearly distinct from those of *Streptomyces flavopersicus* and *Streptomyces spectabilis*.

Table 3

| | Present strain | Streptomyces flavopersicus | Streptomyces spectabilis |
|---|---|---|---|
| Sporophore structure | simple branching spiral formation | whorl branching spiral formation | simple branching no spiral formation straight sporophore |
| Color of aerial mycelium when cultured on various media in Table 1 | gray | red | pink to orange |

As is apparent from Table 3, the present strain belongs to different species from those of the well known spectinomycin-producing strains. Further, as described above, the present strain is different from *Streptomyces hygroscopicus* in that its product is spectinomycin. Therefore, the present strain was named *Streptomyces hygroscopicus* var. *sagamiensis* as a new variety.

As in the case with other strains of actinomycetes, the present strain can undergo mutation by artificial means such as ultraviolet ray irradiation, $Co^{60}$ irradiation, X-ray irradiation and various mutation-inducing chemicals. Accordingly, any strain of *Streptomyces hygroscopicus* var. *sagamiensis* even if thus mutated, can be used in the present invention so far as it has the ability to produce spectinomycin.

Any of the conventional methods for culturing microorganisms of actinomycetes may be used in the process of the present invention; and any standard medium is acceptable so long as it contains a suitable carbon source, nitrogen source and inorganic compounds and small amounts of additional nutrients necessary for the specific microorganism. For example, as a carbon source: glucose, starch, glycerine, mannose, fructose, inositol, mannitol, sucrose, molasses, and hydrocarbons such as n-parraffins, may be used alone or in combination. As an inorganic nitrogen source: ammonium chloride, ammonium sulfate, urea, ammonium nitrate, sodium nitrate, etc. and as a natural nitrogen source, peptone, meat extract, yeast extract, dry yeast, corn steep liquor, soybean powder, and casamino acid, may be used alone or in combination. In addition, such inorganic salts as sodium chloride, potassium chloride, calcium carbonate, and phosphate may be added to the medium if necessary. Furthermore, organic or inorganic materials capable of promoting growth of the present microorganism and production of spectinomycin may be added thereto.

It is preferred that the microorganism be initially grown in at least one seed culture prior to being inoculated in the main fermentation medium. The seed medium is incubated for a period of time to develop a suitable organism population (typically for about 48 hours) and then used to either inoculate a second seed medium or the main fermentation medium.

A liquid culturing method, particularly, submerged stirring culturing method is most suitable for the present process. Culturing temperature is 20° to 40'C, and preferably within the range of 25° to 30°C. It is desirable to carry out culturing at an approximately neutral pH. Under the above conditions, spectinomycin is formed and accumulated in the culture liquor after about 2 to 7 days. When the yield of spectinomycin in the culture liquor reaches a maximum, culturing is discontinued and the antibiotic is isolated and purified from the culture liquor after the microbial cells are removed, such as by filtration.

After the microbial cells are removed from the culture liquor, isolation and purification of the antibiotic is carried out according to the methods usually used in the purification of water-soluble basic antibiotics. For example, adsorption and desorption from a cation exchange resin, adsorption and desorption from active carbon powders, cellulose column chromatography, adsorption and desorption from Sephadex LH-20 column, etc. can be used. Further, since spectinomycin is insoluble in almost all the organic solvents, but soluble in water and methanol, the desired substance can be dissolved and precipitated by properly combining these properties.

Preferably, the culture filtrate is at first adjusted to a pH of 6.8 and then subjected to adsorption on a column of cation exchange resin, Amberlite IRC-50 ($H^+$ form). After washing with water, elution is carried out with 0.5N HCl. The active fraction is neutralized with an anion exchange resin, Dowex 44 ($OH^-$ form) and then concentrated under reduced pressure. The concentrated solution is decolorized by HP-10 (porous resin for decolorization produced by Mitsubishi Chemical Industries Ltd.) and then concentrated under reduced pressure to a paste state. The concentrate is dissolved in methanol and subjected to adsorption on a column of Sephadex LH-20 and then eluted with methanol. The eluate is concentrated under reduced pressure, and the resulting concentrate is allowed to stand at a low temperature, whereby crystalline spectinomycin is precipitated. By repeatedly carrying out recrystallization from water or methanol, pure spectinomycin can be obtained.

The antibacterial spectra of spectinomycin obtained by the present process against various microorganisms are given in Table 4.

1010) is initially inoculated into 30 ml of a first seed medium containing 2 percent glucose, 2 percent defatted soybean powder and 0.1 percent $CaCO_3$ (pH 7.2 before sterilization) in a 250 ml Erlenmeyer flask. Culturing is carried out with shaking at 30°C for 48 hours. 30 ml of the thus obtained seed culture liquor is thereafter inoculated into 300 ml of a second seed medium in a 2 l. Erlenmeyer flask provided with baffles. The composition of the second seed medium is identical to that of the first seed medium. The second seed medium is also subjected to culturing with shaking at 30°C for 48 hours. 900 ml of the second seed culture liquor (corresponding to the content of three 2 l. flasks) is then inoculated into 18 l. of a main fermentation medium in a 30 l. glass jar fermenter. The composition of the main fermentation medium is identical with that of said first seed medium. Culturing in the jar fermenter is carried out at 30°C for 72 hours by aeration-stirring method (revolution: 350 rpm; aeration 18 l./min.).

12 l. of a filtrate obtained by removing microbial cells from the culture liquor by filter press is adjusted to a pH of 6.8 with hydrochloric acid. Then, the filtrate is passed through a column of 800 ml of Amberlite IRC-50($H^+$). After washing with 3 l. of water, elution is carried out with 0.5N HCl at a flow rate of SV 1. (SV Table 4

| Minimum inhibiting concentration by agar dilution method ($\mu$g/ml) | |
|---|---|
| Microorganisms tested | Minimum inhibiting concentration ($\mu$g/ml) |
| *Streptococcus faecalis* ATCC 10541 | 42 |
| *Staphylococcus aureus* ATCC 6538P | 6.6 |
| *Staphylococcus aureus* KY 8942 (resistant to kanamycin, paromomycin and streptomycin) | 13.0 |
| *Staphylococcus aureus* KY 8953 (resistant to Kanamycin, paromomycin, streptomycin, tetracycline, erythromycin, penicillin G, sulfonamide and neomycin) | >1,760 |
| *Staphylococcus aureus* KY 8957 (resistant to paromomycin, streptomycin, tetracycline, chloramphenicol, penicillin G and sulfonamide) | 6.6 |
| *Bacillus subtilis* No. 10707 | 6.6 |
| *Bacillus cereus* ATCC 9634 | 13.0 |
| *Bacillus mycoides* ATCC 9463 | 6.6 |
| *Klebsiella pneumoniae* ATCC 10031 | 2.6 |
| *Escherichia coli* ATCC 26 | 6.6 |
| *Escherichia coli* K-12 ML 1629 ($ECR_5$) (resistant to chloramphenicol, kanamycin, tetracycline and neomycin) | 104.0 |
| *Escherichia coli* ($ECR_3$) resistant to streptomycin, kanamycin, neomycin, paromomycin, spectinomycin, tetracycline and chloramphenicol) | >166.0 |
| *Escherichia coli* ML 1878 ($ECR_8$) (resistant to streptomycin) | 3.2 |
| *Escherichia coli* ML 3306 ($ECR_9$) (resistant to streptomycin, kanamycin, paromomycin and neomycin) | 3.2 |
| *Pseudomonas aeruginosa* BMH No. 1 | 42 |
| *Proteus vulgaris* ATCC 6897 | 20 |
| *Shigella sonnei* ATCC 9290 | 20 |
| *Salmonella typhosa* ATCC 9992 | 2.6 |

Practice of a specific embodiment of the present invention is illustrated by the following representative example.

EXAMPLE 1

In this example, one loopful of *Streptomyces hygroscopicus* var. *sagamiensis* (ATCC 21703) (FERM-P means space velocity, that is the value obtained by dividing the volume of liquid to be treated per hour by the volume of resin packed in the column.), whereby spectinomycin is eluted. About 500 ml of the active fraction is then neutralized with about 50 ml of Dowex 44 ($OH^-$) resin and then concentrated under reduced pressure. 30 ml of the concentrate is passed through a column of decolorizing resin HP-10 (porous resin for decolorization produced by Mitsubishi Chemical Industries Ltd.) and the active fraction obtained by elution with water is concentrated under reduced pressure to a paste state. The resulting paste is then dissolved in methanol and the methanol solution is passed through a column of 100 ml of Sephadex LH-20. Elution is carried out with methanol. The resulting eluate is concentrated under reduced pressure and the concentrate is allowed to stand at a low temperature, whereby 13.5 g of crystals is precipitated. Thereafter, a pure, white crystalline substance can be obtained by repeating recrystallization from water or methanol.

The result of elementary analysis, molecular weight, melting point, ultraviolet and infra-red absorption spectra, solubility in various solvents, specific rotation and various chromatographies of the substance thus obtained are identical with those of spectinomycin described in the above-mentioned publications of Oliver et al. and Mason et al.; and thus the present substance is identified as spectinomycin.

We claim:

1. A process for producing spectinomycin which comprises culturing a spectinomycin-producing strain of *Streptomyces hygroscopicus* var. *sagamiensis* in a nutrient medium, accumulating spectinomycin in said culture medium and recovering said spectinomycin.

2. A process according to claim 1 wherein said strain is *Streptomyces hygroscopicus* var. *sagamiensis* ATCC 21703.

3. A process according to claim 2 wherein said culturing is carried out at 30°C.

* * * * *